Figure 6:
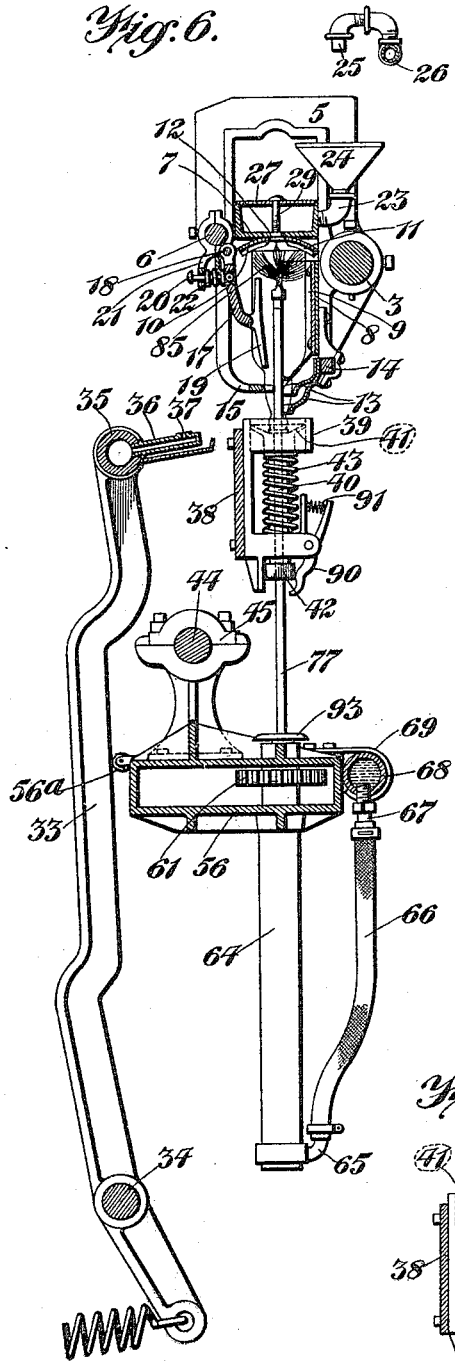

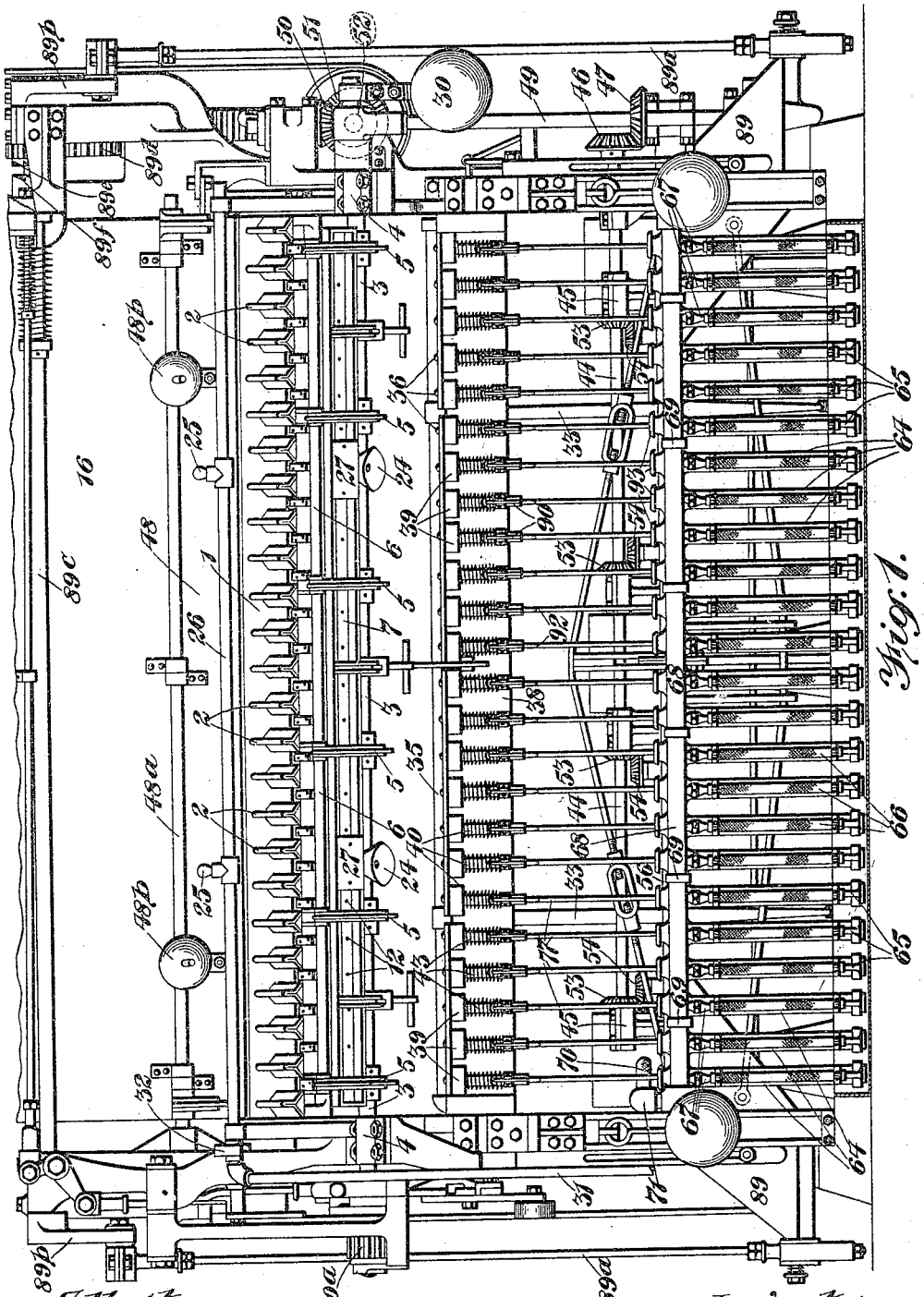

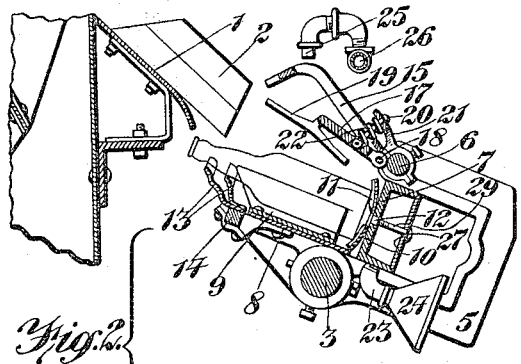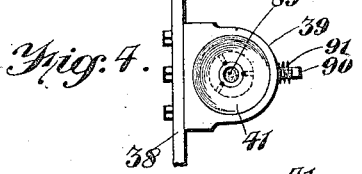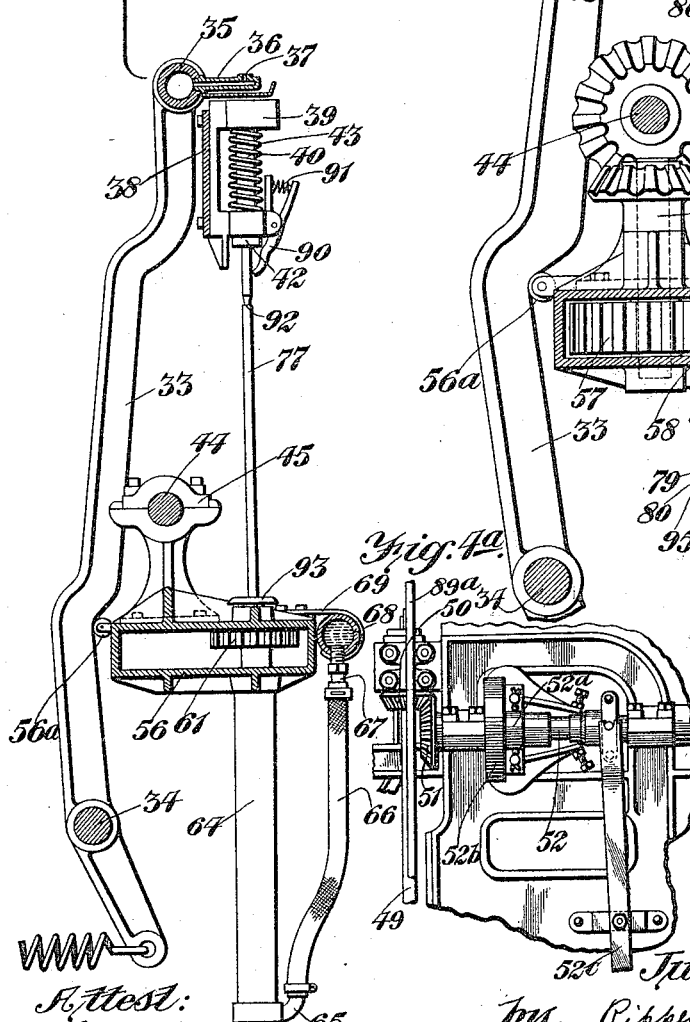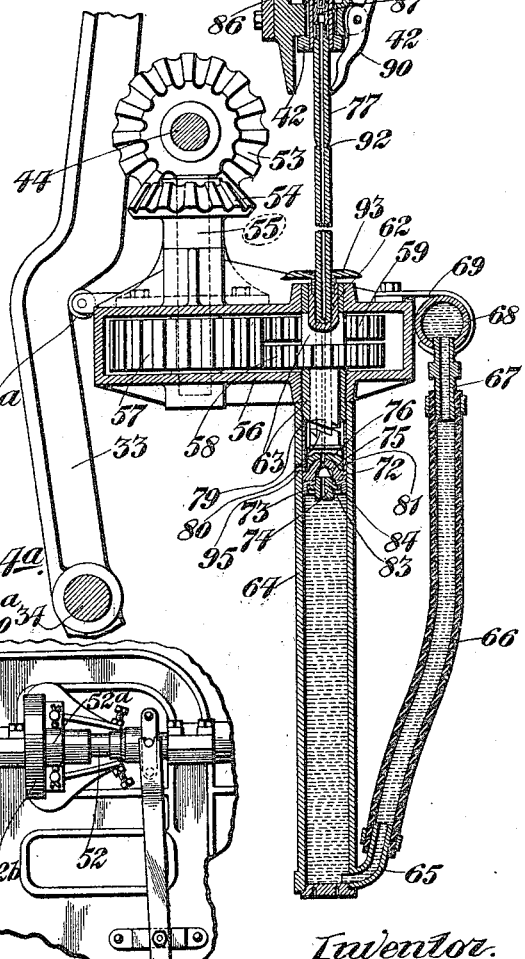

J. H. KINTZELE.
BOTTLE RINSING AND BRUSHING MECHANISM.
APPLICATION FILED FEB. 6, 1915.

1,209,850.

Patented Dec. 26, 1916.
4 SHEETS—SHEET 3.

Attest:
Charles A. Becher,
R. M. Lawrence.

Inventor.
Julius H. Kintzele,
by Rippey Kingsland
His Attorneys.

J. H. KINTZELE.
BOTTLE RINSING AND BRUSHING MECHANISM.
APPLICATION FILED FEB. 6, 1915.
1,209,850.
Patented Dec. 26, 1916.
4 SHEETS—SHEET 4.
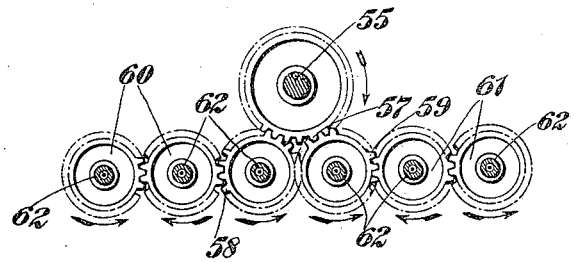
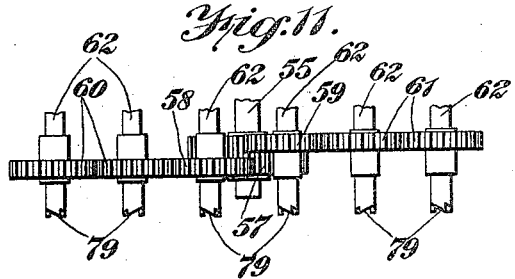
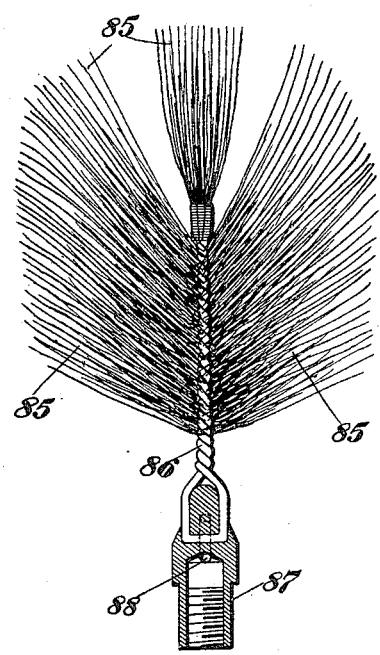
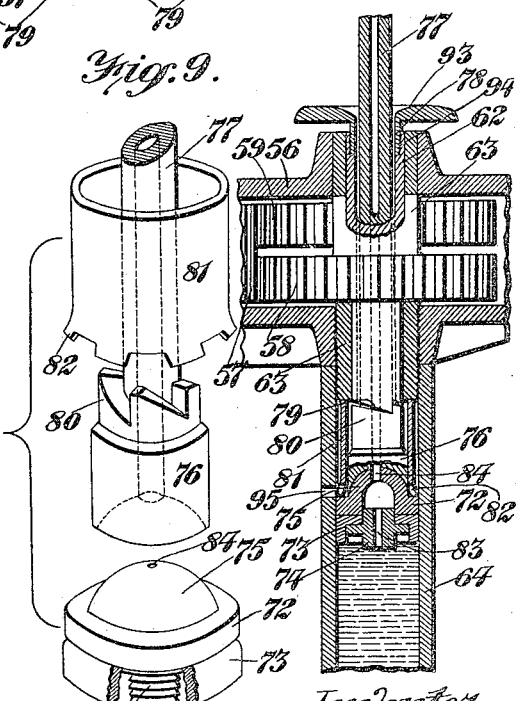
Inventor.
Julius H. Kintzele,
by Rippey & Kingsland
His Attorneys.
Attest:
Charles A. Becker,
R. M. Lawrence.

UNITED STATES PATENT OFFICE.

JULIUS H. KINTZELE, OF ST. LOUIS, MISSOURI.

BOTTLE RINSING AND BRUSHING MECHANISM.

1,209,850.　　　　　Specification of Letters Patent.　　Patented Dec. 26, 1916.

Application filed February 6, 1915. Serial No. 6,483.

*To all whom it may concern:*

Be it known that I, JULIUS H. KINTZELE, a citizen of the United States, residing at the city of St. Louis and State of Missouri, have invented a new and useful Bottle Rinsing and Brushing Mechanism, of which the following is a specification.

This invention relates to bottle washing machines, and has particular reference to that mechanism for rinsing and brushing the bottles.

In a companion application, Serial No. 6,482 filed concurrently herewith, I have illustrated and described a machine for subjecting bottles to liquid by forcing the liquid in the form of jets or sprays against the interior and exterior surfaces of the bottles, and also moving the bottles through a quantity of the liquid, whereby the materials or substances adhering to the interior and exterior surfaces of the bottles will be removed. After the bottles have been subjected to the action of liquid as stated, and after the adhering materials and substances have been removed from the bottles by the action of the liquid, as fully illustrated and described in my said companion application, it is desirable that the bottles be thoroughly rinsed and brushed, so that the bottles will be completely prepared for other and further use.

The subject matter of the present application comprises mechanism adapted to be embodied in and to coöperate with the complete machine which includes the washing and soaking mechanism illustrated and described in my companion application mentioned. The present mechanism is so arranged that it will receive the bottles after they have been soaked and washed, and will then complete the preparation of the bottles for re-use by thoroughly rinsing and brushing the interior thereof, thus certainly and positively removing all foreign materials and substances from the interior of the bottles. The operation of the various coöperating and component mechanisms is so timed and synchronized that the bottles are automatically inverted so that the open ends thereof are downward, whereupon the rinsing and brushing operation is effected by forcing jets of rinsing water into the bottles during the operation of the brushes therein.

The object of the invention is to provide an improved and novel mechanism arranged and designed to perform the functions and operations briefly stated above, in addition to numerous other functions and operations, and comprising the novel arrangement, combination and construction of parts and elements herein fully illustrated, described and claimed.

Figure 5:
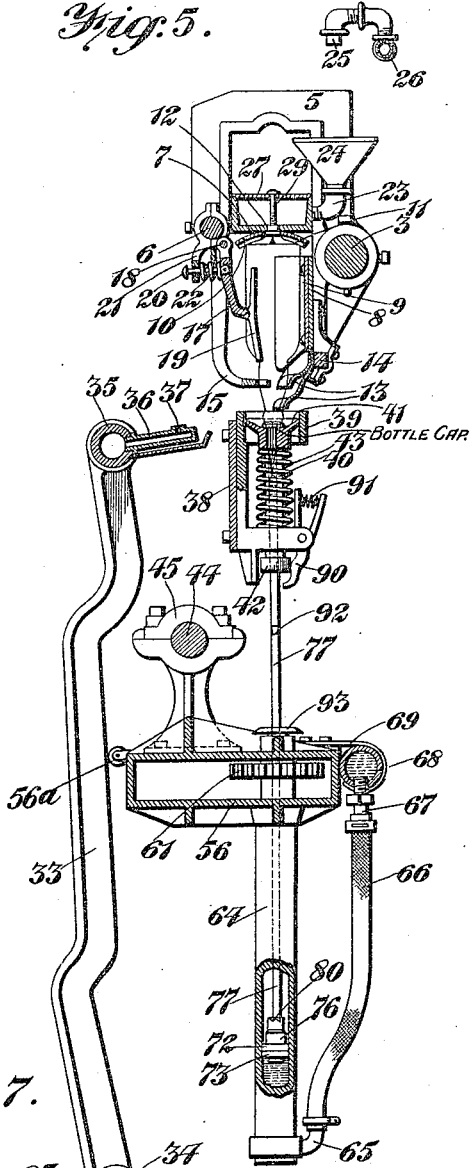
Figure 7:
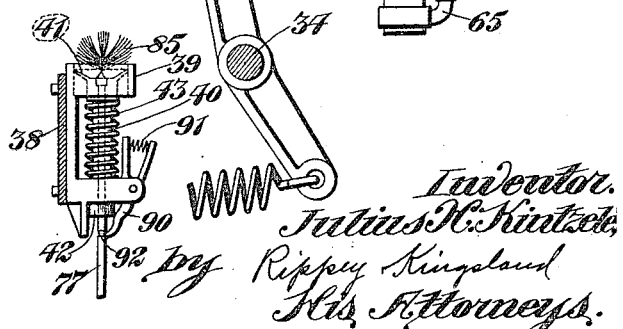

In the accompanying drawings in which I have illustrated a suitable embodiment of the invention Figure 1 is an elevation of the rinsing and brushing mechanism and illustrating a machine capable of rinsing and brushing a large number of bottles simultaneously. Fig. 2 is a sectional view of a part of the machine illustrating the movable support or carrier which receives and moves the bottles to position to be acted upon by the rinsing and brushing devices, the latter being illustrated in their proper normal positions before the bottles are moved to position for treatment thereby. Fig. 3 is a sectional view enlarged with respect to Fig. 2 and illustrating important portions of one of the brushing devices. Fig. 4 is a plan view of one of the cups against which the lower open ends of the bottles are retained during their treatment by the rinsing and brushing mechanism. Fig. 4ª illustrates a clutch device controlling the operation of the mechanism which raises and lowers the rinsing and brushing mechanism. Fig. 5 is a sectional view illustrating the effect on the rinsing and brushing mechanism when any bottle having a stopper or seal thereon has been inadvertently placed in the machine for treatment. Fig. 6 is a similar sectional view illustrating the brush within the interior of the bottle. Fig. 7 is a detailed view illustrating one of the latching devices which hold the individual brush rods from operation when no bottles are in position to be acted on by the respective brushes. Fig. 8 is a relatively enlarged sectional view illustrating the actuating mechanism for the brush rods. Fig. 9 is a perspective disassembled view of parts of the brush operating mechanism. Fig. 10 illustrates one of the brushes and its connection with the brush rod. Fig. 11 is a view illustrating the train of gearing by which a number of brushes are driven from a single master actuator. Fig. 12 is a diagrammatic plan view of the same mechanism illustrated in Fig. 11.

The bottles are delivered from the washing mechanism within the casing 16 through a door 48. I have arbitrarily employed these reference numerals at this point, and out of their sequential order, because the same reference numerals are applied to these parts in my copending application above mentioned. It will be understood that the washing and soaking mechanism operates within the casing 16, and after the bottles have been sufficiently washed and soaked they are discharged through the door 48. As illustrated the door 48 is supported by a rock shaft 48ª to which a number of weights 48ᵇ are attached so that the door is normally held closed, but is capable of being opened by raising the weights 48ᵇ, or in any other suitable manner.

The bottles discharged through the door 48 are delivered on to an inclined shelf 1 which is divided into a plurality of spaces by suitable partitions 2 which constitute guides for properly guiding the bottles into their respective pockets in the carrier which supports the bottles while they are being rinsed and brushed. A shaft 3 is revolubly mounted in bearings 4 in the end frames of the machine, and supports a number of yokes 5, the upper arms of which support a rod 6. A trough 7 is attached between the arms of the yokes, and a plate 8 is secured to the lower arms of the yokes and supports a plurality of U-shaped members 9. The members 9 are arranged with respect to the guides 2 so that the bottles sliding from the shelf 1 will be received and positioned by the members 9, as illustrated in Fig. 2 in which a bottle is shown retained in position by one of the members 9. Concave supporting elements 10 are secured to the trough 7 below the members 9 for receiving and locating the lower ends of the bottles, and said members are provided with radial ribs 11, whereby the water passing through appropriate openings 12 in the trough 7 and in the members 10 will be distributed and caused to flow over the entire exterior surfaces of the bottles. For each of the bottle positioning members 9 I provide a pair of engaging members 13 attached to a rock shaft 14 mounted in the carrier frame consisting of the yokes 5. The rock shaft 14 is operable in any suitable manner to move the members 13 away from the necks of the bottles to permit the bottles to move out of the carrier.

For each bottle which the carrier is adapted to receive, I provide an angular arm 15 secured to the rock shaft 6, and provided with a bifurcated extremity adapted to engage the neck of the bottle in the manner illustrated in Figs. 5 and 6, when the shaft 6 is rocked for such purpose. A coöperating series of arms 17 are pivoted to the arms 15 by means of supporting pins 18. Each of the arms 17 is bifurcated at its free end and supports two bottle engaging portions 19 adapted to engage against the sides of the bottle when the shaft 6 is properly operated, so as to coöperate with the remaining portions of the carrier to retain the bottles therein, as illustrated in Figs. 5 and 6. Each of the arms 17 has a pin 20 pivoted thereto and passing through a hole in the suitably extended portion 21 of the corresponding arm 15. The head of the pin 20 limits movement of and supports the arm 17 in its proper position with respect to the corresponding arm 15. A spring 22 encircles each of the pins 20 and, being interposed between said arm 17 and the projecting portion 21 imparts a yielding pressure against the arms 17 effectively to engage them properly against the bottles when the shaft 6 is rocked for such purpose.

Water is delivered into the trough 7 through pipes 23 having funnels 24 attached to their outer ends and arranged to receive water from the nozzles 25 communicating with a water supply pipe 26. A plate 27 is secured to the walls of the trough 7 above the open ends of the pipes 23, being retained in place by a suitable binding element 29. The plates 27 are positioned so that they will prevent overflow of the water entering the trough but will cause proper flow of the water toward opposite ends of the trough, so that the water will flow through all of the holes 12 and be distributed over the exterior of all of the bottles. It will be understood that the water is discharged from the nozzles 25 only during the time that the carrier is in the position illustrated in Figs. 5 and 6, so that the exterior of the bottles will be rinsed by the water thus supplied during the time that the interiors of the bottles are being subjected to the action of the rinsing and brushing mechanism. The shaft 3 is provided with a weight 30 (Fig. 1) which is effective normally to hold the shaft in position so that the carrier will be retained in the position illustrated in Fig. 2. After the bottles have been delivered from the shelf 1 into the carrier the shaft 3 is rocked as usual by any suitable mechanism for that purpose, so as to move the bottles to the position illustrated in Figs. 5 and 6, and to place the funnels 24 under the nozzles 25.

The pipe 26 is supplied with water from any suitable source through a pipe 31, the flow of the water being controlled as usual so that water is delivered through the nozzles 25 only during the time that the carrier is in the position illustrated in Figs. 5 and 6, for action by the brushing and rinsing mechanism. For present purposes it is immaterial what specific mechanism may be employed for rocking the shaft 3, and said shaft may be controlled manually or otherwise as preferred, it being apparent, however, that operation of said shaft may if desired be effected manually by manipulation of the arm to which the weight 30 is attached, or mechanically by driving a machine element, such as a gear 30ª, attached to said shaft 3. So, also, it is immaterial by what specific means the supply of the water through the pipe 26 is controlled, it being obvious that the flow therethrough may be controlled by a valve 32 positioned in said pipe, or otherwise, as preferred.

A series of arms 33 are mounted on a rock shaft 34 and support a pipe 35 at their upper ends. A series of nozzles 36, corresponding in number and position to the number and position of the bottle supports in the carrier, project from the pipe 35 and are arranged to discharge the water vertically through openings 37. Immediately following the rocking of the shaft 3 and the consequent inversion of the bottles, water is forced under pressure into the pipe 35 and is ejected through the holes 37 against and into the bottles, thus subjecting the bottles to the rinsing action of the water. This occurs prior to the operation of the brushing mechanism, and the rinsing devices coöperating directly therewith, which, combined with these devices, constitute the subject matter of the present invention. After a sufficient quantity of water has been thus applied to the bottles the arms 33 are actuated to move the pipe 35 and the nozzles 36 from the position illustrated in Fig. 2 to the position illustrated in Figs. 5 and 6, thus enabling the rinsing and brushing mechanism proper to operate on the bottles.

The machine includes a vertically movable supporting member 38 having a number of brackets 39 attached to its outer side. At this juncture it is sufficient to state that the supporting member 38 is horizontally disposed, and is movable vertically toward and away from the bottle carrier which is supported and operated by the shaft 3 as above explained. The mechanism for raising and lowering the frame in which the supporting member 38 is mounted may be of any suitable construction, and will be briefly described in connection with the description of the operation of the brushing devices. It is appropriate to state at this point, however, that the normal position of the supporting member 38 is that illustrated in Fig. 2 in which the nozzle 36 is capable of movement thereover, but after the arms 33 have been retracted to the position illustrated in Figs. 5 and 6 the supporting member 38 is moved vertically toward the bottle carrier, so that the brushing and rinsing mechanism proper may be brought into operation. The brackets 39 conform in number and position to the number of bottles which the carrier is capable of supporting and the positions which the bottles occupy in the carrier. A sleeve 40 is movably mounted in each of the brackets 39 and is provided on its upper end with a cup or hopper 41 and on its lower end with a detachable nut or collar 42 for limiting upward movement of the sleeve, and for the additional function presently described. A spring 43 encircles the sleeve 40 abutting at its lower end upon the arm of the bracket 39 through which the sleeve is movable, and abutting at its upper end against the under side of the cup or hopper, thus yieldingly supporting the sleeve in its raised position and permitting vertical movement of the brackets 39 relative to the cups 41. This action occurs as an incident to the upward movement of the supporting member 38 when the cups or hoppers 41 are stopped by contact with the lower ends of the bottles. This permits relative movement and conformation of their positions by the cups or hoppers to meet the requirements of any difference in the lengths or positions of the bottles in the carrier. The sleeves 40 constitute guides for the brushing devices.

Referring now to the construction and operation of the brushing devices, the latter are driven by a shaft 44 journaled in bearings 45 supported by a movable frame which is mounted below the movable support 38. The shaft 44 has a beveled gear 46 thereon meshing with a gear 47 splined on a shaft 49 which, in turn, has a gear 50 meshing with a gear 51 loosely mounted on a drive shaft 52, so that the shaft 44 will be maintained in constant rotation by operation of the gear 51 when the latter is driven by the drive shaft. The shaft 52 has a clutch member 52$^a$ keyed to slide thereon, (Fig. 4$^a$) and adapted to be moved into engagement with a coöperating clutch member 52$^b$ rigid with the hub of the gear wheel 51 which is loose on the shaft. By closing the clutch the gear wheel 51 will be caused to revolve with the shaft, and thus drive the shaft 49 and thereby the shaft 44, as a result of which the trains of brushing devices are driven, as hereinafter explained. The clutch may be operated by any suitable means, and for such purpose I have illustrated a lever 52$^c$, by operation of which the clutch may be opened and closed. The shaft 44 has a number of gears 53 thereon meshing with and driving gears 54 on the upper ends of shafts 55 journaled in bearings in a gear casing 56. Each of the shafts 55 has fixed thereon within the casing 56 a gear 57 (Fig. 3) which meshes with and drives two gears 58 and 59, each of which is the head or leading gear of the entrained series of gears 60 and 61, respectively. By reference to Fig. 11 it will be observed that the gears 58 and 59 are in different planes, so that both may mesh with and be driven by the gear 57 without interfering with each other. In this manner the train of gears 60 will be driven from the gear 58 and a train of gears 61 will be driven from the gearing 59, and all of the gears of both trains are driven by the gear 57. Each gear of the several trains of gears is mounted on a hollow vertical shaft 62 revolubly journaled in bushing members 63, (Fig. 8) located in bearings in the gear casing 56. Each of the gears of the several trains of gears within the gear casing is arranged to operate one of the brushes. A number of cylinders 64 depend from the gear casing, and each thereof has a nipple 65 opening into its lower end and connected with one end of a flexible pipe 66; the opposite ends of the pipes 66 are connected with nipples 67 opening into and arranged to receive water from a pipe 68 extending across the machine and retained in place by supports 69 attached to the gear casing. Water is supplied to the pipe 68 through a water supply connection 70 (Fig. 1) and is controlled in any suitable manner, as by a valve 71. A piston 72 is operatively mounted in each of the cylinders 64 and is provided with a packing member 73 retained in connection with the piston by a nipple 74. The piston 72 is provided on its upper side with a smoothly ground rounded portion 75 which fits closely within a socket in a member 76, so as to form an impervious joint or connection therewith. The member 76 is attached to the lower end of a hollow rod 77 which extends through the hollow shaft 62 of the corresponding gear, it being understood that there is one of the rods 77 for each gear of the several trains of gears in the gear casing. The rods 77 are vertically movable through and with respect to the hollow shafts 62 there being sufficient space between the rods 77 and the shafts 62, as indicated at 78 (Fig. 8), for the passage of water under circumstances hereinafter mentioned. The lower end of each of the shafts 62 is provided with a clutch portion 79, and the upper end of each of the members 76 is provided with a clutch portion 80 adapted to be held in engagement with the clutch member 79 by the pressure of the water below the piston in the cylinder 64. A sleeve 81 (Figs. 8 and 9) is above each piston 72 and is provided with obliquely disposed teeth or projections 82 adapted to contact with the interior of the cylinder and with the upper surface of the piston. The sleeve 81 is adapted to abut against the lower end of the bushing or sleeve 63 and against the piston 72 so as to limit movement of the clutch member 76 toward the end of the shaft 62. The sleeve permits the clutch member 76 to remain in clutched engagement with the end of the shaft 62, but prevents said parts from being abutted end to end, thus preventing the strain due to the pressure of the water against the piston 72 from being imparted to the gears within the casing or to their shafts, but enabling clutched engagement to be effected and maintained so that the rods 77 will be driven by their respective gears, except when the clutch members are disengaged under circumstances hereinafter explained. The nipple 74 is formed with a central passage 83, and the piston 72 is formed with a central passage 84 adapted to register with the passage through the rod 77, thus permitting the water from the cylinder 64 to enter said rods 77 and be conducted thereby to the brushing devices. Each brush includes bristles 85 twisted in a wire holder 86 which is attached to a head or shank 87 screwed onto the upper end of the rod 77 and arranged to receive water from said rod. In normal or idle position the frame 89 which supports the gear casing 56 and the remaining parts of the brushing mechanism is in its lowest position so that the brushes are within the sleeves 40, but when said frame 89 and the mechanism mounted therein are raised the brushes are carried into the bottles. While the brushes are in the bottles the rods 77 are revolved, thereby operating the brushes against the interior of the bottles, and thus thoroughly brushing them, while the water is discharged in jets through openings 88 into the heads or shanks 87. In this manner the interiors of the bottles are thoroughly cleansed by the action of the jets or sprays of liquid and the revolving brushes.

From the foregoing it will be understood that the carrier is operated to adjust the bottles so that when the support 38 is moved the openings in the cups or hoppers 41 will be brought into registration with the open ends of the bottles, thus permitting the brushes to be moved into the bottles when they are raised by the movement of the frame 89. The frame 89, which carries the shaft 44, the gear casing 56, and other parts of the brushing mechanism, is raised at the proper time by the operation of links 89$^a$ having their lower end connected to said frame and their upper ends connected to cranks 89$^b$ (Fig. 1) attached to a shaft 89$^c$ journaled in bearings at the upper part of the framing of the machine. A constantly rotating gear 89$^d$ is loosely mounted on the shaft 89$^c$ and is provided with a clutch portion 89$^e$ adapted to be engaged by a movable clutch member 89$^f$ slidably on said shaft. Obviously, when the clutch is closed in the usual manner the shaft 89$^c$ will be revolved, thereby raising the frame 89 to raise the brushing mechanism and place it in operation. This movement of the brushing mechanism carries the brushes 85 into the bottles and, at the appropriate time the clutch 52$^a$—52$^b$ is closed so that the shaft 49 will be driven and thereby drive the brushing mechanism effectively to cause the brushes to be rotated during the time that they are in the bottles. It will be understood that the gear 47 which is splined on the shaft 49 is moved upwardly with the frame 89, and is at all times retained in mesh with the gear 46. The mechanism for operating the clutch members 89ᵉ and 89ᶠ, and the mechanism for driving the gear 89ᵈ are included in the machine with which my present invention is intended to coöperate, and since their use and operation is well understood and they constitute no part of the present invention further description and illustration thereof is unnecessary.

The upward movement of the gear casing operates rollers 56ᵃ thereon against cam surfaces on the arms 33, thereby forcing said arms from the position illustrated in Fig. 2 to the position illustrated in Figs. 5 and 6, permitting the brushing mechanism to operate upon the bottles.

In the event that any one or more of the bottles remains closed by failure to remove the stoppers or seals therefrom, it is obvious that the brushes will be unable to pass into such bottles. Provision is made whereby the brushes coming into contact with such closed bottles will be prevented from operating without interfering with the operation of the remaining brushes which have entered the bottles. In Fig. 5 is illustrated a bottle from which the stopper or seal had not been removed. In such event the brush rod is carried upwardly with the frame as the frame rises until the end of the brush wire 86 contacts with the stopper. Further upward movement of the brush rod is thereby prevented, so that during the continued upward movement of the gear casing the brush rod will be disengaged from the corresponding gear, thereby enabling the gear to revolve without operating the brush rod. The gearing is thereby moved out of engagement with the clutch on the brush rod, the parts assuming positions substantially as illustrated in Fig. 5.

When no bottle is in position for any one or more of the brushes it is desirable to prevent movement of the brushes into the bottle carrier with which the brush bristles would become entangled, resulting in injury to the brushes. Automatic means is provided for this purpose. Each of the brackets 39 supports a pivoted latch member 90, the lower end of which is actuated toward the corresponding rod 77 by a suitable spring 91. The rod 77 is formed with a circumferential shoulder 92 adapted to engage with the lower end of the corresponding latch 90 and prevent further vertical movement of said rod. Unless the sleeve 40 be pressed downwardly by contact with a bottle the latch 90 will engage the shoulder 92 and thus prevent movement of the rod 77, so that the brush carried thereby will not be enabled to move into the carrier. However, when the sleeve 40 is held by contact with a bottle the collar or nut 42 engages the latch 90 and releases the same from the rod 77, thus permitting the rod to move a sufficient distance to operate the brush within the corresponding bottle. Immediately on removal of the bottles from the cups 41 the springs 43 expand and restore the sleeves 40 and their connected parts to their normal positions.

I have previously mentioned that there is a space 78 between the rod 77 and the interior of the hollow shaft 62 within which it is movable. A flaring element 93 (Fig. 8) is provided with a threaded extension 94 engaging with the upper end of the corresponding shaft 62, and is arranged as a protection for the bearing of the shaft to keep the water out of contact therewith and prevent any water from passing into the gear casing to the detriment of the gearing therein. Some of the water which is caught by the flaring members 93 will flow therefrom onto the gear casing but beyond the bearings for the shafts, and a portion of the liquid will flow into the spaces 78 and thence be discharged into the spaces below the lower ends of said shafts and above the pistons 72. The liquid so discharged will pass between the teeth 82 of the sleeve 81 and outwardly through suitable openings 95 in the cylinders 64, it being understood that said openings 95 are above the highest point of movement of said pistons, as will be clearly understood by reference to Fig. 8.

From the foregoing description of the several mechanisms it will be understood that there is essentially a sequence of operations and movements, and that this sequence of operations and movements must be continuously and successively maintained. In order that these matters may be more completely comprehended it is appropriate now to state briefly the operations in their proper order.

As previously mentioned the present mechanism is adapted to be combined and coöperate with the washing and soaking mechanism constituting the subject matter of my said application Serial Number 6,482. The shaft 52 is supported by the framing of the combined machine and is maintained in continuous rotation, but will not operate the rinsing and brushing mechanism until the proper time in the sequence of operations. After the bottles have been delivered from the bottle washing mechanism onto the carrier supported by the shaft 3, the latter is operated in any preferred manner to support the bottles in inverted positions ready for the operation of the rinsing and brushing devices. The bottles are first acted upon by water supplied thereto through the pipe 26 and distributed over the bottles through the holes in the bottom of the distributing trough 7, and by jets of water supplied from the pipe 35 through the openings 37 of the nozles 36. The distribution of the water from the trough is continuous while the bottles are supported in inverted position immediately above the brushing devices, but the jets of water from the pipe 35 are alternated with the actions of the brushing devices. The next operation is effected by the rotation of the shaft 89^c (Fig. 1) caused by closing the clutch 89^e—89^f whereby said shaft will be rotated one revolution, effectively to raise and to lower the frame 89. The frame 89 carries upwardly the gear casing 56 and the brushing mechanism supported thereby and operated by the trains of gearing therein. The upward movement of the gear casing causes the rollers 56^a to actuate the arms 33 and thereby move the pipe 35 out of position so as to permit continued movement of the gear casing to move the brushes into the bottles. After the brushes enter the necks of the bottles the clutch 52^a—52^b is closed so that the continuously rotating shaft 52 will, through the connections therefrom, drive the trains of gears whereby the brushes are revolved. At this time the valve 71 is operated in any suitable manner, the particular means of operation being immaterial, to admit the water under pressure into the pipe 68 so that jets of water are forced into the bottles through the openings 88 in the brush heads or shanks (Fig. 10), thereby supplying the necessary water to enable the brushes to perform their proper functions. Obviously continuous rotation of the shaft 89^c moves the frame 89 to its starting point, thereby moving the gear casing 56 downwardly and withdrawing the brushes from the bottles. When the rollers 56^a pass below the curved portions of the arms 33 the latter can move forward to place the nozzles 36 under the bottles, thereby again subjecting the bottles to the action of jets of water from said nozzles. During the downward movement of the frame 89 the clutch 52^a—52^b is opened, thus permitting the operation of the brushes to stop about the time that they are withdrawn from the bottles. It is preferred that the above operation of the brushing mechanism be again performed so as to subject the bottles to an additional operation of the brushes, thus thoroughly cleansing them and completing their operation for further and additional use. The bottles may be subjected alternately to the action of the jets of water from the pipe 35 and to the action of the brushes as often as desired, in which event the operations above mentioned are successively performed.

It will be understood that there may be various alterations and modifications in the construction and operation of the machine without departing in the least from the spirit and scope of the invention. Therefore, while describing a preferred embodiment of the invention I do not restrict myself to specific features of construction and arrangement, but

What I claim and desire to secure by Letters Patent is:

1. The combination with bottle supporting and positioning mechanism, of devices for directing jets of water against the bottles in said supporting and positioning mechanism, endwise movable rods, brushes on said rods, an actuator for moving each rod and brush endwise to place the brushes in the bottles, locking latches for holding the brushes against endwise movement, and means for releasing said latches located in line with the bottle support and positioned to be actuated by the bottles therein.

2. In a bottle washing machine, the combination of a series of brushes movable into and out of bottles, mechanism for moving said brushes into the bottles, mechanism for revolving the brushes after they enter the bottles, and means for preventing operation of brushes which cannot enter bottles.

3. In a bottle washing machine, the combination of a bottle supporting device operable to position the bottles for the brush mechanism, endwise movable brush rods, brushes on said rods, guides in which said rods and brushes are movable, an independently releasable latch for holding each of said rods against endwise movement, a support on which said guides are mounted, mechanism for moving said support to engage said guides with the bottles, elements for releasing said latches located in line with the bottle support and positioned to be actuated by bottles therein, and means for holding said latches in engagement with the rods which have no bottles in line with them in the bottle supporting device.

4. In a bottle washing machine, a bottle support operable to position the bottles for operation of the brushes, guides adapted to engage the bottles after they have been positioned, brushes supported in said guides, an actuator for moving each brush into the bottle in line therewith in the support, latch devices holding and preventing movement of the brushes which have no bottles in line with them in the support, and elements for releasing said latches located in line with the bottle support and positioned to be actuated by contact with the bottles in the support whereby brushes which have bottles in line with them in the support will be enabled to move.

5. In a bottle washing machine, a support for bottles, endwise movable rods, brushes on said rods, guides in which said brushes and rods are movable, cylinders, pistons in said cylinders for supporting and moving said rods, spraying devices alternating with the operation of said brushes to spray the bottles, means holding the rods against endwise movement, and releasing means for said holding means lying in the path of movement of said rods and adapted to be actuated by contact with bottles in the support, whereby brushes which have no bottles in line with them in the support will be held against endwise movement.

6. In a bottle washing machine, a support for bottles, endwise movable brush rods, brushes on said rods, cylinders, pistons in said cylinders for supporting and moving said rods, means for holding the rods against endwise movement and releasable means for said holding means lying in the path of movement of said rods and adapted to be actuated by contact with bottles in the support, whereby brushes which have no bottles in line with them in the support will be held against movement.

7. In a bottle washing machine, the combination of a bottle support, a movable frame, brushes carried by said frame, guides in which said brushes are movable, mechanism for moving said frame toward and away from said support and said guides, cylinders, pistons mounted in said cylinders for actuating said brushes, passages for admitting fluid into said cylinders to actuate said pistons and thereby said brushes, gearing in said frame, connections for revolving said brushes from said gearing, means for holding said brushes against movement by said pistons, and releasing means for said holding means adapted to be actuated by contact with bottles in the support, whereby brushes which have no bottles in line with them in the support will be held against movement.

8. In a bottle washing machine, a bottle support, a movable frame, gearing in said frame, hollow rods mounted in said frame, fluid controlled devices for holding said rods in position to be operated by said gearing, mechanism for moving said frame toward said support a distance sufficient to extend said rods into bottles in said support, devices preventing said movement of the rods, and means for releasing said devices located in line with the bottle supports and positioned to be actuated by bottles therein, whereby rods which have bottles in line with them in the support will be released.

9. In a bottle washing machine, a bottle support, brushes, mechanism for moving said brushes endwise into open bottles in said support, driving mechanism for revolving the brushes after they enter the bottles in said support, latches for holding the brushes disconnected from said driving mechanism, and means for releasing said latches located in line with the bottle support and positioned to be actuated by bottles therein, whereby any brushes remaining outside of the bottles will be prevented from revolving, and passages for supplying water into the bottles in said support.

10. In a bottle washing machine, a support for bottles, a frame movable toward and away from said support, cylinders in said frame, passages for admitting water into said cylinders, pistons controlled by the water in said cylinders, movable hollow rods supported by said pistons and actuated endwise thereby into bottles in said support for conducting water from said cylinders into the bottles, a gear for rotating each of said rods, releasable clutches whereby said rods will be rotated by said gears and adapted to be released when the corresponding rods are moved endwise into contact with closed bottles to enable such rods to remain stationary while other rods entering bottles in the support are rotated, and brushes supported by said rods.

11. In a bottle washing machine, a carrier for bottles, a gear casing, series of gears in said casing, cylinders supported by said casing, means for admitting water into said cylinders, a piston in each of said cylinders, a hollow endwise movable rod extending into each of said cylinders and supported by said pistons, respectively, releasable clutches whereby said rods will be rotated by the respective gears in said casing, passages for admitting water from said cylinders into said rods, brushes on said rods, mechanism for raising said casing and thereby said rods to extend said rods and brushes into bottles in said carrier, means for holding the rods against endwise movement, and releasing means for said holding means lying in the path of movement of said rods and adapted to be actuated by contact with the bottles in the support, whereby brushes which have no bottles in line with them in the support will be held against endwise movement.

12. In a bottle washing machine, the combination of a carrier arranged to hold bottles, of a movable frame, gearing in said frame, brush rods in said frame in line with the bottle positions in said carrier adapted to be held in position to be driven by said gearing by liquid pressure and to be held out of such position by engagement of said rods with closed bottles in said carrier, and mechanism for moving said frame and said rods to extend said rods into open bottles in line therewith in said carrier and against closed bottles in line therewith in said carrier.

13. In a bottle washing machine, a bottle carrier, a movable gear casing, gears in said casing, means for moving said casing to and away from said carrier, mechanism under control of bottles in said carrier whereby said gears will be operated when said casing is adjacent to said carrier and will be left idle when said casing is in its normal position away from said carrier, brush rods extending through said casing, clutches for rotating said rods by said gears, a piston arranged to hold said brush rods in position to be driven by said gears and to permit disengagement of said clutches, means for moving said casing, and means for causing disengagement of said clutches when no bottles are in line therewith in said carrier.

14. In a bottle washing machine, a carrier arranged to support bottles, gearing, hollow rods for conducting water into bottles in said carrier, brushes on said rods, clutches whereby said rods may be rotated by said gearing, means whereby said rods and brushes may be moved into bottles in said carrier, mechanism for operating said gearing and thereby said rods while said rods and brushes are within the bottles, and means for releasing said clutches when no bottles are in line with the corresponding rods, and also when closed bottles are in line with such rods.

15. In a bottle washing machine, a carrier arranged to support bottles, hollow rods movable endwise into and out of bottles in said carrier, brushes on said rods, mechanism for revolving said rods and brushes after they enter bottles in said carrier, means for holding the rods against endwise movement and releasing means for said holding means lying in the path of movement of said rods and adapted to be actuated by contact with bottles in the support, whereby brushes which have no bottles in line with them in the support will be held against endwise movement.

16. In a bottle washing machine, a carrier arranged to support bottles, brushes, guides for said brushes, a support for said guides, latches carried by said support for holding the brushes against movement, and releasing means in connection with said guides and adapted to be actuated by contact of the guides with bottles in the support, whereby brushes which have no bottles in line with them in the support will be held against movement.

17. In a bottle washing machine, a carrier arranged to support bottles, a movable support, a series of guides in said support, endwise movable rods extending into said guides, brushes on said rods, latches carried by said support for holding the rods against endwise movement, means for moving said support to carry said guides into contact with the bottles, and releasing means for said latches in connection with said guides and adapted to be actuated by contact of the guides with the bottles in the support, whereby brushes which have no bottles in line with them in the support will be held against movement.

18. In a bottle washing machine, a carrier arranged to support bottles, brush rods movable into and out of bottles in said carrier, latch devices normally in position to engage and prevent movement of said brush rods into said carrier, means controlled by bottles in said carrier for preventing engagement of said latch devices with said rods, and means for moving said brush rods into the bottles.

19. In a bottle washing machine, a carrier arranged to support bottles, cylinders, pistons mounted in said cylinders, means for admitting water into said cylinders to actuate said pistons, hollow rods connected to said pistons, brushes on said rods, guides in which said brushes and rods are movable, a support, springs yieldingly supporting said guides in said support, latches carried by said support for holding the rods and brushes against movement, actuating connections for moving said support to engage said guides against bottles in line therewith in the carrier and to move said guides with respect to said support, and elements for releasing said latches and adapted to be actuated by contact of said guides with bottles in the support, whereby brushes which have no bottles in line with them in the support will be held against movement.

20. In a bottle washing machine, a carrier arranged to support bottles, brushes movable to and from position to act on said bottles, hollow endwise movable rods for operating and conducting water to said brushes, mechanism for operating said rods and brushes to and from position to operate on the bottles in said carrier, means for holding the rods against endwise movement, and releasing means for said holding means lying in the path of movement of said rods and adapted to be actuated by contact with bottles in the support, whereby brushes which have no bottles in line with them in the support will be held against endwise movement.

21. In a bottle washing machine, water supply devices, a carrier arranged to support bottles, cylinders receiving water from said supply devices, hollow rods communicating with said cylinders, brushes on said rods, pistons controlled by the water in said cylinders for holding said rods in position to be operated and permitting displacement of said rods with respect to the operating gears, operating gears for revolving said rods, mechanism for moving said gears and rods to operate said brushes against bottles in said carrier, locking latches for holding the brushes against operation, and means for releasing said latches located in line with the bottle supports and positioned to be actuated by bottles therein.

22. In a bottle washing machine, cylinders, means for admitting water into said cylinders, a piston in each of said cylinders, rods supported by pistons, passages through said pistons and said rods for permitting passage of the water from said cylinders, a gear for revolving each of said rods, releasable clutches for revolving said rods by said gears and adapted to be opened by engagement of said rods with closed bottles, means for moving said rods to and from position to operate on bottles, and means for opening said clutches as an incident to the movement of the corresponding rods which have no bottles in line with them, whereby such rods will be held against movement.

23. In a bottle washing machine, cylinders adapted to receive water to be used to cleanse bottles, a piston in each cylinder, a hollow rod extending from each cylinder for conducting water therefrom to correspondingly positioned bottles, said rods being supported by said pistons, a gear for each of said rods, hollow shafts on which said gears are mounted and encircling said rods, a passage between each of said rods and the hollow shaft through which it extends adapted to permit water to pass into the corresponding cylinder above the piston therein, and a passage through said cylinder permitting egress of the water so admitted.

24. In a bottle washing machine, a casing, driving gears in said casing, cylinders arranged to contain water, pistons in said cylinders controlled by the water therein, shafts on said gears extending into said cylinders, rods extending through said shafts into said cylinders, clutch devices whereby said rods will be driven by said shafts, elements in said cylinders preventing end to end abutment of said clutch devices but permitting clutching engagement thereof, passages into said cylinders above said pistons, and passages from said cylinders above said pistons.

25. In a bottle washing machine, a casing, hollow shafts journaled in said casing, gears on said shafts in said casing, cylinders arranged to contain water, rods for conducting water from said cylinders to operate on the bottles, clutch teeth on the lower ends of said shafts, clutch members controlled by said pistons adapted to engage with the clutch teeth on said shafts whereby said rods will be rotated by said shafts, and elements preventing pressure by said clutch members against the ends of said shafts but permitting clutched engagement thereof.

26. In a bottle washing machine, a casing, hollow shafts journaled in said casing, gears on said shafts in said casing, cylinders below said casing, rods extending through said shafts into said cylinders, passages between said rods and said shafts, clutches for driving said rods by said shafts, pistons in said cylinders adapted to be operated by liquid pressure to engage said clutches, elements preventing the pressure of said pistons from being imparted to said shafts, and passages from said cylinders above said pistons.

27. In a bottle washing machine, a casing, hollow shafts journaled in said casing, gears in said casing on said shafts, cylinders below said casing arranged to contain water, pistons in said cylinders, rods extending through said hollow shafts into said cylinders, ball and socket connections whereby said rods will be controlled by said pistons, clutch members on said shafts and on said rods whereby said rods will be driven by said shafts, means preventing the pressure of said pistons from being imparted to said shafts, means for conducting water through said shafts into said cylinders above said pistons, and passages for permitting the egress of the water from said cylinders above said pistons.

In witness whereof, I have signed this specification in the presence of two subscribing witnesses.

JULIUS H. KINTZELE.

Witnesses:
CHARLES A. BECKER,
JOHN D. RIPPEY.

Copies of this patent may be obtained for five cents each, by addressing the "Commissioner of Patents, Washington, D. C."